United States Patent
Gaman et al.

(10) Patent No.: US 12,500,902 B2
(45) Date of Patent: Dec. 16, 2025

(54) METHOD AND APPARATUS FOR MALICIOUS FILE EXTENSION DETECTION

(71) Applicant: Crowdstrike, Inc., Sunnyvale, CA (US)

(72) Inventors: Mihaela Gaman, Bucharest (RO); Marian Radu, Bucharest (RO); Joel Robert Spurlock, Portland, OR (US)

(73) Assignee: Crowdstrike, Inc., Sunnyvale, CA (US)

( * ) Notice: Subject to any disclaimer, the term of this patent is extended or adjusted under 35 U.S.C. 154(b) by 256 days.

(21) Appl. No.: 18/308,043

(22) Filed: Apr. 27, 2023

(65) Prior Publication Data

US 2024/0364711 A1    Oct. 31, 2024

(51) Int. Cl.
*H04L 9/40*     (2022.01)
*G06F 18/2415*  (2023.01)

(52) U.S. Cl.
CPC ...... *H04L 63/1416* (2013.01); *G06F 18/2415* (2023.01); *H04L 63/1425* (2013.01)

(58) Field of Classification Search
None
See application file for complete search history.

(56) References Cited

U.S. PATENT DOCUMENTS

| | | | |
|---|---|---|---|
| 7,328,456 B1 * | 2/2008 | Szor | G06F 21/56 713/188 |
| 9,665,713 B2 * | 5/2017 | Avasarala | G06F 21/566 |
| 9,811,665 B1 * | 11/2017 | Xu | G06F 21/562 |
| 9,948,663 B1 * | 4/2018 | Wang | H04L 63/1416 |
| 9,990,511 B1 * | 6/2018 | Dreyfus | G06F 3/0619 |
| 10,116,688 B1 * | 10/2018 | Yun | G06F 21/566 |
| 10,320,810 B1 * | 6/2019 | Xu | H04L 63/1408 |
| 11,210,396 B2 * | 12/2021 | Alsulami | G06F 21/10 |
| 2003/0079142 A1 * | 4/2003 | Margalit | H04L 51/212 726/24 |

(Continued)

FOREIGN PATENT DOCUMENTS

EP    4455915 A1    10/2024

OTHER PUBLICATIONS

Wang et al. "MineDetector: JavaScript Browser-Side Cryptomining Detection using Static Methods", 2021 IEEE 24th International Conference on Computational Science and Engineering (CSE), 2021. (Year: 2021).*

(Continued)

*Primary Examiner* — Kaveh Abrishamkar
(74) *Attorney, Agent, or Firm* — Elliott, Ostrander & Preston, P.C.

(57) ABSTRACT

A feature vector is created that comprises a plurality of values, each representing a corresponding portion of a filename extension for a digital file. During an inference workflow of a neural network model, an embedding vector is created that represents, in a meaningful way, the feature vector for the filename extension. A class label prediction value is then computed, based on an evaluation of the embedding vector, a first plurality of embedding vectors representing a plurality of feature vectors for a plurality of benign filename extensions, and a second plurality of embedding vectors representing a plurality of feature vectors for a plurality of malicious filename extensions. A prediction as to whether the digital file has been renamed by a malicious computer program is made, based on the class label prediction value.

18 Claims, 4 Drawing Sheets

(56) References Cited

U.S. PATENT DOCUMENTS

| | | | | |
|---|---|---|---|---|
| 2009/0327490 A1* | 12/2009 | Saka | .................... | G06F 21/552 |
| | | | | 709/224 |
| 2016/0203318 A1* | 7/2016 | Avasarala | ............. | G06F 21/566 |
| | | | | 726/23 |
| 2018/0048657 A1* | 2/2018 | Hittel | .................. | H04L 63/1433 |
| 2018/0239826 A1* | 8/2018 | Epstein | ............... | G06Q 50/184 |
| 2018/0278647 A1* | 9/2018 | Gabaev | .............. | H04L 63/1425 |
| 2021/0182397 A1 | 6/2021 | Karnik et al. | | |
| 2021/0326438 A1* | 10/2021 | Dichiu | .................... | G06F 21/56 |
| 2022/0350886 A1 | 11/2022 | Mehta et al. | | |
| 2024/0314161 A1* | 9/2024 | Schaaf | ................... | H04L 51/08 |

OTHER PUBLICATIONS

Anonymous, "A Complete Guide to Data Augmentation/ DataCamp," Apr. 6, 2023 (Apr. 6, 2023), pp. 1-24, XP093149976, Retrieved from the Internet: URL: https://web.archive.org/web/20230406190702/https://www.datacamp.com/tutorial/complete-guide-data-augmentation [retrieved on Apr. 10, 2024].

Extended European Search Report for European Patent Application No. 24162926.0, mailed Apr. 22, 2024, 10 pages.

Prosise, Jeff, "Text Classification with Neural Networks," Mar. 30, 2023 (Mar. 30, 2023), pp. 1-5, XP093150042, Retrieved from the Internet: URL: https://web.archive.org/web/20230330050033/https://www.atmosera.com/blog/text-classfication-with-neural-networks/ [retrieved on Apr. 10, 2024-04-10].

\* cited by examiner

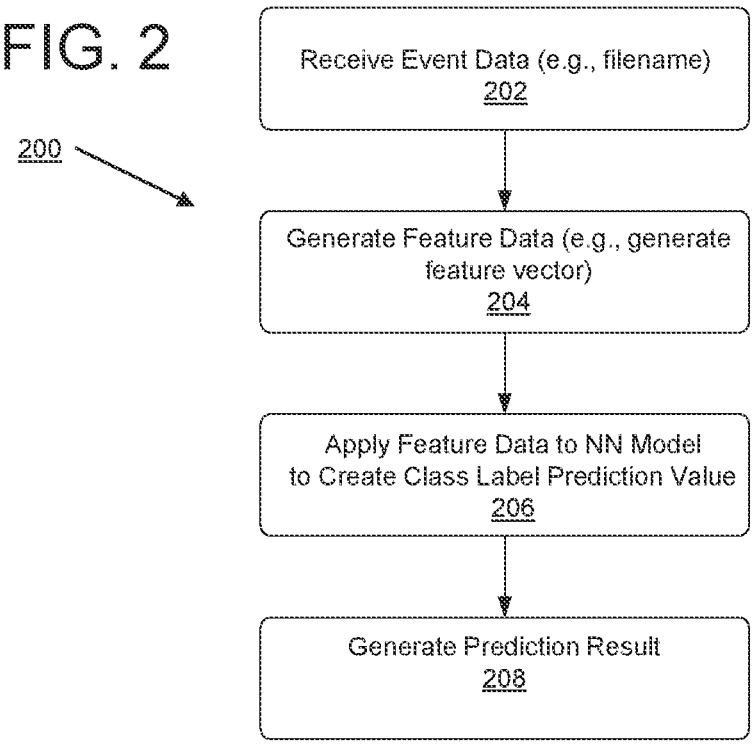
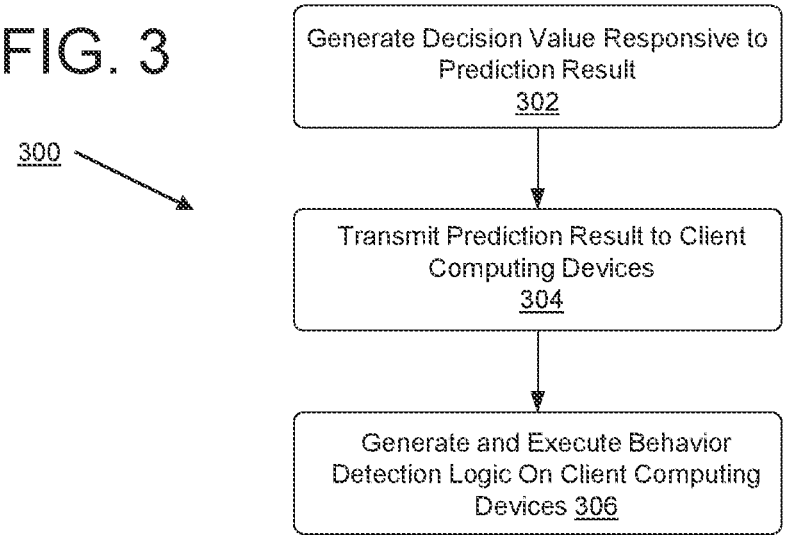

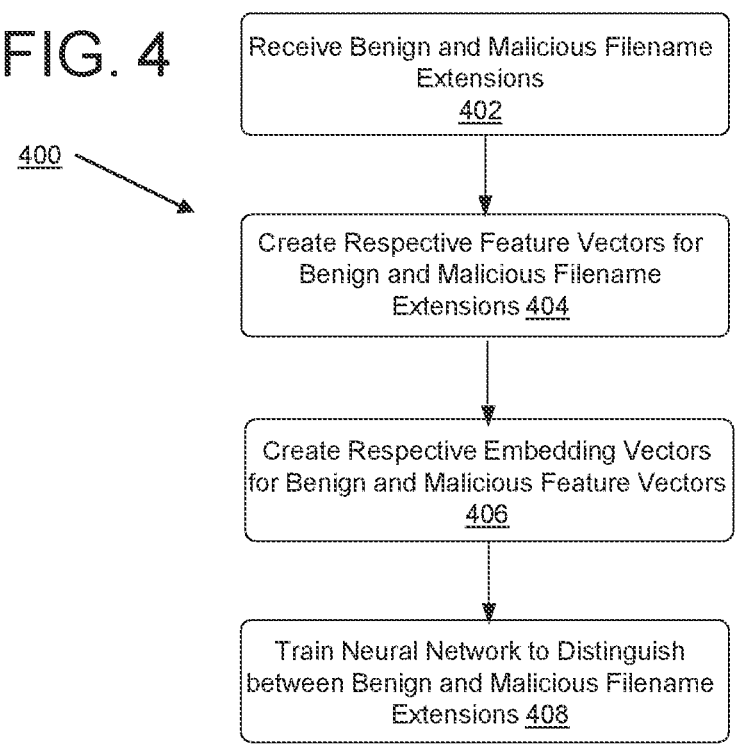

METHOD AND APPARATUS FOR MALICIOUS FILE EXTENSION DETECTION

TECHNICAL FIELD

Embodiments of the present disclosure relate to digital computing systems, particularly with respect to predicting whether a digital file has been modified by a malicious computer program.

BACKGROUND

Digital security exploits that steal, destroy, or hold hostage programs, resources, data, or private information on computing devices are an increasing problem. Governments and businesses devote significant resources to preventing intrusions, thefts, and ransom requests, related to such digital security exploits. Some of the threats posed by security exploits are of such significance that they are described as cyber terrorism or industrial espionage.

Security threats come in many forms, including computer viruses, worms, trojan horses, spyware, keystroke loggers, adware, rootkits, and ransomware. Such security threats may be delivered through a variety of mechanisms, such as spearfish emails, clickable links, documents, executables, or archives. Other types of security threats may be posed by ill-intentioned users who gain access to a computer system and attempt to modify, delete, or restrict legitimate users from accessing information without authorization. With many of these threats, one or more digital files containing malicious source code can be downloaded or otherwise installed on a computing device, or an existing one or more digital files on the computing device can be modified, for example, to include malicious source code, or to prevent users from accessing digital files, or to prevent legitimate, benign, computer programs from executing or accessing digital files. Sometimes, the file names, file types, or file extensions of the digital files may be modified so that it is not readily apparent what the digital files contain. In the case of ransomware, digital files are encrypted and renamed, for example, by changing a portion of the filenames for digital files, for example, by changing the filename extensions for the digital files, so that legitimate users cannot access the digital files, or at least cannot attempt to do so without first paying a ransom.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a flowchart of certain aspects of a method to predict that a digital file has been modified according to example embodiments of the present disclosure.

FIG. 3 illustrates a flowchart of a method to predict that a digital file has been modified according to example embodiments of the present disclosure.

FIG. 4 illustrates a flowchart of actions that may be taken based upon a prediction that a digital file has been modified according to example embodiments of the present disclosure.

DETAILED DESCRIPTION

Figure 1:
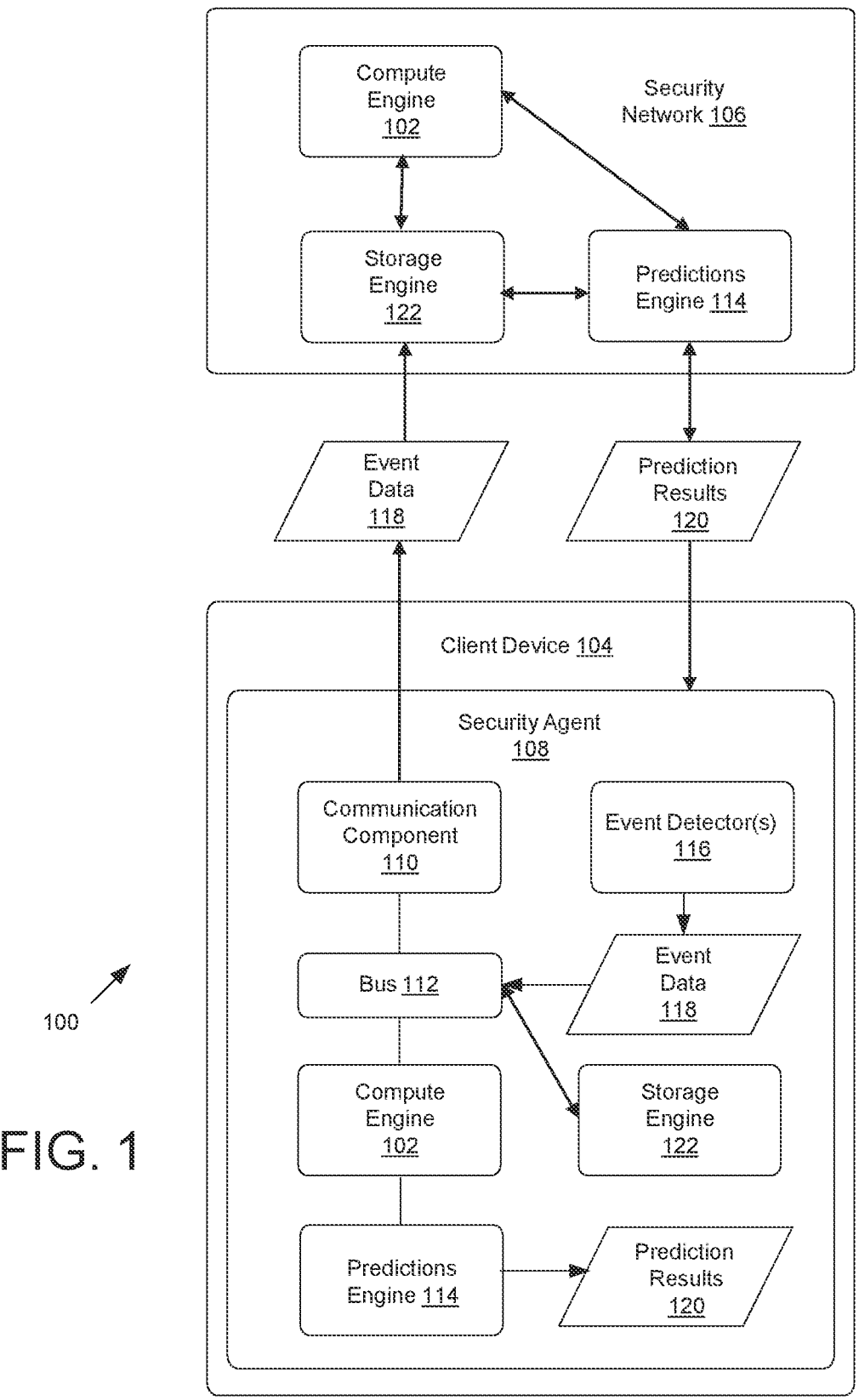
FIG. 1 illustrates an example architecture of a distributed security system in which embodiments of the present disclosure may be used.

Embodiments of the present disclosure can predict whether a digital file, or simply, a "file", for example, residing in data storage on or accessible by a client computing device, has been modified for benign or malicious purposes. For example, it is useful for data security purposes to quickly and accurately identify whether files, their filenames, or their filename extensions have been changed. Doing so enables a quick assessment of whether files are being modified, moved to, from, or about, or copied on the client computing device such that there exists an associated data loss risk, as may be the case when such action is based on malicious intent.

Ransomware is a widely occurring type of cyber-attack, featuring an ever-growing number of families and versions of ransomware attacks. Typical ransomware attack behavior is manifested through the encryption of a user's digital files on or accessible via their computing device. A ransom payment, preferably cryptocurrency (due to its untraceable nature), is often requested in return for providing an applicable decryption key. However, many ransomware attacks prove to be, in fact, just evil scams, in which paying the ransom does not always result in users recovering access to their files. Thus, detecting ransomware, in any stage of its manifestation, proves to be a valuable capability.

In addition to encrypting a user's digital files, ransomware attacks mark infected or ransomed data by modifying properties of the files, such as a portion of the filenames for the user's files, for example, the filename extensions of the filenames for the user's files. The filename extension is just a marker or identifier of the type of file or application that can access or operate on the file, and the content of the file does not have to match it.

While traditional ransomware attacks tend to use predefined, known, or knowable, extensions (e.g., following a discernable pattern and making use of foreseeable keywords), more and more attacks employ randomized modifications to properties of files, such as filenames, or portions thereof, such as filename extensions, or portions thereof, making it difficult to recognize the type of ransomware attack so that remedial action can be taken to interrupt or mitigate the harm being done. Current approaches use regular expressions-based, or "regex-based", solutions to detect filenames or filename extensions used by known ransomware. A drawback to doing so is the inability to generalize filenames or filename extensions used by ransomware when faced with newer, unrecognized, or unknown families or versions of ransomware. Embodiments of the present disclosure use a machine learning model such as a Neural Network Model, such as a Convolutional Neural Network ("CNN"), to automatically detect ransomware generated filename or filename extension modifications while the filename or filename extension modifications are actually happening, or very shortly thereafter. Such embodiments may provide a means of preventing a ransomware attack or infection from spreading.

As subsequently described, embodiments of the present disclosure enable a machine learning model solution for predicting or detecting modifications to digital files, such as filename modifications to digital files and, in particular, predicting or detecting filename extension modifications, such as often occurs during a ransomware attack. Embodiments of the present disclosure can predict whether a digital file has been modified by a legitimate or benign computer program or an illegitimate or malicious computer program. The embodiments do so by first creating a feature vector of values for properties of the digital file, such as the filename or filename extension for the digital file. Each value in the feature vector represents a corresponding portion of the filename, or filename extension for the digital file. Then, during an inference workflow with a machine learning model, for example, a neural network model, an embedding representation value is generated for each value in the feature vector, resulting in an embedding vector representing the feature vector for the filename or filename extension for the digital file. The embodiments then create a class label prediction value based on evaluation of one or more of (e.g., all of) the following: 1) the embedding vector representing the feature vector for the filename or filename extension for the digital file, 2) a first plurality of embedding vectors representing a plurality of feature vectors for a plurality of legitimate or benign filename or filename extensions, or 3) a second plurality of embedding vectors representing a plurality of feature vectors for a plurality of anomalous or malicious filename or filename extensions. Finally, a prediction or classification is made regarding whether the digital file has been modified by a malicious computer program based on the class label prediction value.

FIG. 1 depicts an example of a distributed security system 100 in which embodiments of the present disclosure may be deployed. The distributed security system 100 can include distributed instances of a compute engine 102 that can run locally on one or more client computing devices 104, or simply, client devices 104, and/or in a security network 106. As an example, some instances of the compute engine 102 can run locally on client devices 104 as part of security agents, or sensors 108, executing on those client devices 104. As another example, other instances of the compute engine 102 can run remotely in a security network 106, for instance, within a cloud computing environment associated with the distributed security system 100. The compute engine 102 can execute according to portable computer executable code that can run locally as part of a security agent 108, in a security network 106, and/or in other local or network systems that can also process event data as described herein.

Likewise, the distributed security system 100 can include distributed instances of a predictions engine 114 that can run locally on one or more client devices 104, and/or in a security network 106. As an example, some instances of the predictions engine 114 can run locally on client devices 104 as part of security agents 108 executing on those client devices 104. As another example, other instances of the predictions engine 114 can run remotely in a security network 106, for instance, within a cloud computing environment associated with the distributed security system 100. The predictions engine 114 can execute according to portable computer executable code that can run locally as part of a security agent 108, in a security network 106, and/or in other local or network systems that can also process event data as described herein.

A client device 104 can include or be one or more computing devices. In various examples, a client device 104 can be a workstation, a personal computer (PC), a laptop computer, a tablet computer, a personal digital assistant (PDA), a cellular phone, a media center, an Internet of Things (IoT) device, a server or server farm, multiple distributed server farms, a mainframe, or any other sort of computing device or combinations thereof. In some examples, a client device 104 can be a computing device, component, or system that is embedded or otherwise incorporated into another device or system. In some examples, the client device 104 can also be a standalone or embedded component that processes or monitors incoming and/or outgoing data communications. For example, the client device 104 can be a network firewall, network router, network monitoring component, a supervisory control and data acquisition (SCADA) component, or any other component. An example system architecture for a client device 104 is illustrated in greater detail in FIG. 5 and is described in detail below with reference to that figure.

The security network 106 can include one or more servers, server farms, hardware computing elements, virtualized computing elements, and/or network computing elements that are remote from the client devices 104. In some examples, the security network 106 can be a cloud computing environment. Client devices 104, and/or security agents 108 executing on such client devices 104, can communicate with elements of the security network 106 through the Internet or other types of networks and/or data connections. In some examples, computing elements of the security network 106 can be operated by, or be associated with, an operator of a security service, while the client devices 104 can be associated with customers, subscribers, clients, and/or other users of the security service.

As shown in FIG. 1, instances of the compute engine 102 can execute locally on client devices 104 as part of security agents 108 deployed as runtime executable applications that operate locally on the client devices 104. Local instances of the compute engine 102 may execute in security agents 108 on a homogeneous or heterogeneous set of client devices 104. Similarly, instances of the predictions engine 114 can execute locally on client devices 104 as part of security agents 108 deployed as runtime executable applications that operate locally on the client devices 104. Local instances of the predictions engine 114 may execute in security agents 108 on a homogeneous or heterogeneous set of client devices 104.

One or more cloud instances of the compute engine 102 can also execute on one or more computing elements of the security network 106, remote from client devices 104. The distributed security system 100 can also include a set of other cloud elements that execute on, and/or are stored in, one or more computing elements of the security network 106. For example, the cloud elements of the security network 106 can include a predictions engine 114 and a storage engine 122, as discussed further below.

Local and/or cloud instances of the compute engine 102, and/or other elements of the distributed security system 100 such as predictions engine 114, can process event data 118 about single events and/or patterns of events that occur on one or more client devices 104. Events can include any observable and/or detectable type of computing operation, networking operation, behavior, or other action that may occur on or in connection with one or more client devices 104. According to embodiments of the present disclosure, events can include events and behaviors particularly associated with file system operations, including creating, modifying or renaming a filename or filename extension, downloading, uploading, reading, writing (or otherwise modifying), copying, importing, or exporting, a file, or parts thereof, or moving the location of a file either within a file directory structure or to another file directory structure on the same or different client device 104. By way of non-limiting examples, an event may be a process that created a file, wrote to the file, and saved the file on the client device 104, or opened an existing file, modified the existing file, and/or saved the existing file under the same or different name and/or with the same or different file extension on the client device 104 or on another client device 104. In some examples, events based on other such observable or detectable occurrences can be or include physical and/or hardware events. For instance, the event may be that a Universal Serial Bus (USB) memory stick or other USB device was inserted in, or removed from, a client device 104, particularly when the event occurs in conjunction with recent file system operations such as dragging and/or dropping files between the USB device and a permanent storage device or other drive unit of the client device 104.

Events that occur on or in connection with one or more client devices 104, such as file system operations involving one or more files, can be detected or observed by event detectors 116 of security agents 108 on those client devices 104. For example, a security agent 108 may execute at a kernel-level and/or as a driver such that the security agent 108 has visibility into operating system activities from which one or more event detectors 116 of the security agent 108 can observe event occurrences or derive or interpret the occurrences of events. In some examples, the security agent 108 may load at the kernel-level at boot time of the client device 104, before or during loading of an operating system, such that the security agent 108 includes kernel-mode components such as a kernel-mode event detector 116. In some examples, a security agent 108 can also, or alternately, have components that operate on a computing device in a user-mode, such as user-mode event detectors 116 that can detect or observe user actions and/or user-mode events.

When an event detector 116 of a security agent 108 detects or observes a behavior or event that occurs on a client device 104, such as file system operations, the security agent 108 can place corresponding event data 118 about the event occurrence on a bus 112 or other memory location. For instance, in some examples the security agent 108 may have a local version of a storage engine 122 described herein below or have access to other local memory on the client device 104, where the security agent 108 can at least temporarily store event data 118. The event data 118 on the bus 112, or stored at another memory location, can be accessed by other elements of the security agent 108, including an instance of the compute engine 102, and/or a communication component 110 that can send the event data 118 to the security network 106, and/or to an instance of predictions engine 114.

Each security agent 108 can have a unique identifier, such as an agent identifier (AID). Accordingly, distinct security agents 108 on different client devices 104 can be uniquely identified by other elements of the distributed security system 100 using an AID or other unique identifier, or a combination of an AID and another unique identifier, such as a client device identifier or network and/or IP address associated with the client device. In this manner, event data 118 and/or prediction results 120, for example, related to file system operations involving one or more files, can be associated with a particular client device and/or security agent.

In some examples, event data 118 about events detected or observed locally on a client device 104, such as file system operations involving one or more files or parts thereof, can be processed locally by a compute engine 102 and/or other elements of a local security agent 108 executing on that client device 104. However, in some examples, event data 118 about locally occurring events can also, or alternately, be sent by a security agent 108 on a client device 104 to the security network 106, such that the event data 118 can be processed by a cloud instance of the compute engine 102 and/or other cloud elements of the distributed security system 100, such as predictions engine 114. Accordingly, event data 118 about events that occur locally on client devices 104 can be processed locally by security agents 108, be processed remotely via cloud elements of the distributed security system 100, or be processed by both local security agents 108 and cloud elements of the distributed security system 100.

The storage engine 122 can process and/or manage event data 118 that is sent to the security network 106 by client devices 104, such as events related to file system operations involving one or more files or parts thereof. In some examples, the storage engine 122 can receive event data 118 from security agents 108 provided by an operator of a security service that also runs the security network 106. However, in other examples, the storage engine 122 can also receive and process event data 118 from any other source, including an instance of compute engine 102 executing in security network 106, an instance of the predictions engine 114 executing in security network 106, and security agents 108 associated with other vendors or streams of event data 118 from other providers.

The storage engine 122 can operate on event data, such as event data related to file system operations involving one or more files or parts thereof. In particular, storage engine 122 can sort incoming event data 118, route event data 118 to corresponding instances of the compute engine 102, store event data 118 in short-term and/or long-term storage, output event data 118 to other elements of the distributed security system 100, such as instances of the predictions engine 114, and/or perform other types of storage operations.

A compute engine 102 in the distributed security system 100 can process an event stream of event data 118, such as event data related to file system operations involving one or more files or parts thereof. The event data 118 may have originated from an event detector 116 of a security agent 108 that initially detected or observed the occurrence of an event on a client device 104, and/or may be event data 118 that has been produced by a different instance of the compute engine 102. In a local instance of the compute engine 102 (i.e., an instance of compute engine 102 operating on a client device 104), in some examples, the event stream may be received from a bus 112 or local memory on a client device 104. In a cloud instance of the compute engine 102, in some examples, the event stream may be received via the storage engine 122.

The compute engine 102 can generate a result from event data 118 in an event stream, such as a result about event data related to file system operations involving one or more files or parts thereof. For example, if the event stream includes event data 118 indicating that one or more events occurred that match a behavior pattern, such as, but not limited to, copying a file to a new location, performing a write operation on the copied file, and changing the filename or filename extension of the copied file, the compute engine 102 can generate and output a result indicating that there is a match with the behavior pattern. In some examples, the result can itself be new event data 118 specifying that a behavior pattern has been matched, and/or, for example, the result can be a feature vector associated with a file, as described further below. The generated results may be stored in storage engine 122, for example, for subsequent input to an instance of compute engine 102 or an instance of predictions engine 114.

According to embodiments of the present disclosure, an input event stream of event data 118, such as event data related to file system operations involving one or more files or parts thereof, can be sent to the security network 106 by one or more local security agents 108. Such an input event stream of event data 118 can be received by a storage engine 122 in the security network 106, as shown in FIG. 1. In some examples, security agents 108 can send event data 118 to the security network 106 over a temporary or persistent connection, and a termination service or process of the distributed security system 100 can provide event data 118 received from multiple security agents 108 to the storage engine 122 as an input event stream.

The event data 118 in the input event stream, such as event data related to file system operations involving one or more files or parts thereof, may be in a random or pseudo-random order when it is received by the storage engine 122 in the security network 106. For example, event data 118 for different events may arrive at the storage engine 122 in the input event stream in any order without regard for when the events occurred on client devices 104. As another example, event data 118 from security agents 108 on different client devices 104 may be mixed together within the input event stream when they are received at the storage engine 122, without being ordered by identifiers of the security agents 108. However, the storage engine 122 can perform various operations to sort, route, and/or store the event data 122 within the security network 106.

Digital security systems may find it challenging to process event data, such as event data related to file system operations involving one or more files or parts thereof, to accurately distinguish between legitimate and benign versus illegitimate, malicious or anomalous behavior in the event data, for example, because malware and threat actor behavior can rapidly change. What is needed, and what is provided by the example embodiments described below, is an evaluation of event data to uncover new or previously unknown or undetected malicious or anomalous behavior. To that end, sensors, or security agents 108, on client computing devices 104 collect event data including event data related to file system operations involving one or more files or parts thereof and transmit that event data 118 to local instances of compute engine 102 and/or remote instances of compute engine 102 in security network 106. Once received at a compute engine, the event data can be manipulated to generate results, such as feature vectors, which can then be transmitted to local instances of predictions engine 114 and/or remote instances of predictions engine 114 in security network 106. The predictions engine 114 can process the results received from compute engine 102 and generate prediction results 120. For example, the predictions engine 114 can generate a prediction as to whether a digital file on or accessible via a client computing device 104 has been modified by a malicious computer program. The prediction results 120 can be transmitted back to selected client devices 104 where the predictions can inform practices and generation of threat detection rules logic on the client devices to more accurately counter or pre-empt the occurrence of new or repeated but previously undetected attacks or malicious or anomalous behavior.

FIG. 2 is a flowchart 200 for predicting that a digital file has been modified by an illegitimate or malicious computer program, according to embodiments of the present disclosure. At a high level of abstraction, a digital or electronic or computer file is a stored segment or block of information that is, or is available to, a computer program. At block 202, a local instance of a compute engine 102 in a security agent 108 operating within a client device 104 can receive an event stream comprising event data 118 associated with an occurrence of one or more events on the client device 104 detected by event detector(s) 116. As an example, the compute engine may receive event data 118 related to file system operations on a drive unit of client device 104 involving one or more files or parts thereof stored in a file system resident on a drive unit of client device 104. In example embodiments, the compute engine 102 may receive as part of the event data 118 a filename of a file, a filename extension of the file, a type of the file, and a location of the file in a file directory on client device 104, and optionally on which a file system operation has been detected.

A file system operation may include but is not limited to creating, modifying or renaming a filename or filename extension, downloading, uploading, reading, writing (or otherwise modifying), copying, importing, or exporting a file, or parts thereof, or moving the location of a file either within a file directory structure or to another file directory structure on the same or different client device 104. In other example embodiments, the event data may first be stored in a local instance of a storage engine 122 which can then process and/or manage the event data 118 that is sent to the compute engine 102. In some examples, the local instance of storage engine 122 can receive event data 118 from the security agent 108 provided by an operator of a security service that also runs the security network 106. However, in other examples, the local instance of storage engine 122 can receive and process the event data from a security agent 108 associated with other vendors or streams of event data 118 from other providers. In other example embodiments, the event data may be transmitted from a security agent 108 to security network 106, bypassing any local instances of storage device 122, wherein the event data may be first stored in a cloud instance of storage engine 122. In such cases, the cloud instance of storage engine 122 can sort and route the event data to instances of the compute engine 102, store event data 118 in short-term and/or long-term storage, and output event data 118 to other elements of or in the distributed security system 100. In all these examples, a local- or cloud-instance of compute engine 102 eventually receives event data 118 and can then process and/or manage the event data at block 204, as described below.

Compute engine 102 can generate at block 204 feature data based on the received event data 118, for example, based on one or more of the received filename, filename extension, file type, and file location of a digital file. Alternatively, compute engine 102 can generate feature data without first receiving event data 118. For example, compute engine 102 could inspect one or more digital files in the file system on client device 104 on its own initiative, without ever relying on event detectors 116 to send event data 118, or without waiting for event detectors 116 to send event data 118. For example, the compute engine 102 could crawl or walk all or selected parts of the file system on a periodic basis or according to other criteria to inspect one or more files in the file system on client device 104. For example, the compute engine 102 may track when it last crawled or walked the file directory or a subdirectory in the file system and inspect files with a creation date or a modification date after the date that the compute engine 102 last crawled or walked the file system and generate at block 204 the feature data based on the inspection initiated by the compute engine 102. In either case, as an example, the compute engine 102 may locate a file based on the file location information and inspect the filename, filename extension, file type and/or inspect the contents of the file located at the file location.

The compute engine 102, upon detecting the filename, filename extension, file type and/or the contents of the file, can generate the feature data, e.g., a feature vector, based on the contents of the file. According to one embodiment, the feature vector comprises a number of values, wherein each value represents a corresponding portion of a filename extension for the digital file.

According to embodiments of the present disclosure, a portion of the filename or filename extension comprises an n-gram, where the n-gram is a contiguous sequence of n bytes or n characters in the filename or filename extension. For example, an n-gram is a one-character sequence, i.e., a unigram, wherein n=1. In another example, the portion is a two-character sequence, i.e., bigram, also referred to as a diagram, where n=2. An n-gram can include a particular number of bytes or characters depending on the value of n. As another example, a feature vector based on the filename or filename extension ".crypt" comprises the following array of byte or character unigrams: ".", "c", "r", "y", "p", and "t".

According to embodiments of the present disclosure, filenames or filename extensions, particularly malicious filename extensions, may be variable in length. Thus, embodiments may create a feature vector based on a portion, such as a fixed-length portion, of the filename or filename extension (e.g., the first 10 or 16 characters or the last 10 or 16 characters). According to some embodiments of the present disclosure, the compute engine 102 creating the feature vector comprising the plurality of values, wherein each value represents the corresponding portion of the filename or filename extension, involves creating the feature vector comprising a plurality of integer values, wherein each integer value represents a corresponding portion of the filename or filename extension. Thus, continuing with the above example, the array of character unigrams ".", "c", "r", "y", "p", and "t" obtained from the filename extension ".crypt" is converted, according to embodiment of the present disclosure, to an array of integer values where each integer value represents a character in the filename extension.

At block 206, the feature data 204 is passed from the compute engine 102 to the predictions engine 114 in the security agent 108 of client device 104. The predictions engine 114 receives the feature data 204, for example, a feature vector comprising a plurality of values, wherein each value represents a corresponding portion of the filename or filename extension. The feature vector 204 is applied to the predictions engine 114 at block 206, which obtains an embedding representation value for each integer value in the feature vector during an inference workflow of a previously trained neural network model, such as a character level Convolutional Neural Network (CNN). The embedding representation values comprise an embedding vector that represents the feature vector for the filename or filename extension for the digital file. Predictions engine 114 then creates a class label prediction value by evaluating the embedding vector representing the feature vector for the filename or filename extension for the digital file, as compared to a first set of embedding vectors representing respective feature vectors for benign filenames or filename extensions, and a second set of embedding vectors representing respective feature vectors for malicious filenames or filename extensions, which were learned during a training workflow of the CNN, as described further below. The class label prediction value represents an indication of whether the filename or filename extension is benign or malicious. In one embodiment, the class label prediction value is a probability of whether the filename or filename extension is benign or malicious.

Given the class label prediction value generated at block 206, the predictions engine 114 produces a prediction result at block 208. For example, the predictions engine 114 predicts whether the digital file for which event data was received at block 202 has been modified by a benign or malicious actor or computer program, for example, whether the filename or filename extension for the digital file has been modified by a benign or malicious actor or computer program. According to one embodiment of the present disclosure, a threshold value may optionally be configured for the probability distribution values of class label prediction values so that if the class label prediction value is below the threshold value, the prediction result classifies the filename or filename extension as unknown, rather than benign or malicious. Alternatively, a range or set of threshold values may be configured for the probability distribution values of class label prediction values, in which case the prediction result classifies the filename or filename extension as malicious or benign with different degrees or levels of confidence (e.g., high, medium, low), depending on where the class label prediction value falls within or outside the range or set of threshold values.

With reference to the flowchart 300 in FIG. 3, the predictions engine 114 may generate a decision value at block 302 which declares the filename or filename extension as being benign or malicious in response to the prediction result generated at block 208. At block 304, the predictions engine 114 may transmit the prediction result generated at block 208 or the decision value generated at block 302 to an applicable or relevant client computing device 104. The client computing device 104 may, in turn, transmit the prediction result or decision value to the security network 106. The security network 106, depending on a process ID, a client device 104 ID, a security agent 108 ID, or some combination thereof, can transmit the prediction result or decision value to a select one or more client devices 104. In some embodiments, the prediction result or decision value is transmitted to one or more client devices 104 depending on the prediction result or decision value and/or the likelihood that a copy of the digital file associated with the prediction result may or will be present on one or more other client devices 104, so that those client devices may take appropriate action.

Client devices 104, upon receipt of a prediction result or decision value, can act on that information according to local business logic at block 306. For example, a client device 104 may generate behavior detection logic to be executed by one or more processors or security agents 108 on the client device 104, responsive to receiving the prediction result or decision value, for the purpose of increasing the digital data security, or mitigating or halting a ransomware attack on the client device 104.

The flowchart 400 in FIG. 4 illustrates the training workflow of the neural network model used by the cloud-based predictions engine 114. In particular, with reference to FIG. 4, compute engine 102 receives, at step 402, a corpus of known, legitimate, benign filename extensions or formats obtained from the Internet or worldwide web, for example, from sources such as:

--- en.wikipedia.org/wiki/List_of_filename_extensions_(A-E);
...

en.wikipedia.org/wiki/List_of_filename_extensions_(S-Z); and
en.wikipedia.org/wiki/List_of_file_formats;

While this example uses legitimate filename extensions, it is appreciated that embodiments may also, or alternatively, use legitimate filenames, in the same manner. Similarly, compute engine 102 receives at block 402 a corpus of known, illegitimate, malicious filename extensions or formats obtained from the Internet or worldwide web, for example, from various well-known sources such as Google published documents of known Ransomware. While this example uses illegitimate filename extensions, it is appreciated that embodiments may also, or alternatively, use illegitimate filenames, in the same manner. Compute engine then creates, at block 404, for each of the benign filename extensions, a respective feature vector comprising a plurality of values, wherein each value represents a corresponding portion of the benign filename extension. Similarly, compute engine 102 creates at block 404, for each of the malicious filename extensions, a respective feature vector comprising a plurality of values, wherein each value represents a corresponding portion of the malicious filename extension.

The corpus of benign filename extensions, and the corpus of malicious filename extension may be augmented, according to embodiments of the present disclosure, through user or programmatic input. In either case, the corpus may be augmented by performing one or more permutations on the filename extensions to create additional filename extensions that are then added to the corpus. For a simple example, suppose that the legitimate ".jpg" filename extension is in the corpus of benign filename extensions, and then permutations such as ".JPG" or ".jpG" are created, either by a user or programmatically, and then added to the corpus. Suppose, for another simple example, the malicious filename extension ".locked" with a random string or sequence of a number, N, of numeric or alphanumeric characters appended to it, is in the corpus of malicious filename extensions. For example, the malicious filename extension ".locked309546", where N=6, is in the corpus of malicious filename extensions. User or programmatic input may then be received to add variations on that pattern to the corpus of malicious filename extensions by appending different, arbitrary sequences of numeric or alphanumeric characters, where N=6 or some other selected value.

The corpus of benign and malicious filename extensions, as optionally augmented, are provided to the predictions engine 114, which, at 406 learns end-to-end, during the training workflow of the neural network model, embedding vectors representing the feature vectors for the benign filename extensions and the feature vectors for the malicious filename extensions. At block 408, the predictions engine 114 learns, based on the embedding vectors for the benign and malicious feature vectors, to distinguish between benign and malicious filenames or filename extensions. The resulting trained data is transferred by predictions engine to storage engine 122. Storage engine 122 provides a data infrastructure that allows for storage of, and operations such as a nearest neighbors query on, the trained data, so that the trained data are later available, for example, at block 206, during runtime, that is, during execution of the inference workflow of the neural network model.

A brief description of filename extensions follows. A filename extension or file extension is a suffix to the name of a computer file (e.g., .txt, .docx, .md). The extension indicates a characteristic of the file contents or its intended use. A filename extension is typically delimited from the rest of the filename with a full stop (period), but in some systems it is separated with spaces. Other file extension formats include dashes and/or underscore characters. Some file systems implement filename extensions as a feature of the file system itself and may limit the length and format of the extension, while others treat filename extensions as part of the filename without distinction, that is, the filename extension is treated as just a portion of the filename itself.

Filename extensions can be considered a type of metadata. They are commonly used to imply information about the way data might be stored in the file. The exact definition, giving the criteria for deciding what part of the filename is its extension, belongs to the rules of the specific file system used. Typically, the extension is a substring which follows the last occurrence, if any, of the dot character (example: txt is the extension of the filename readme.txt, and html the extension of privatepartywebsite.index.html). On some file systems, the filename extension is in a separate namespace from the filename.

The file systems for some operating systems do not separate the filename extension metadata from the rest of the filename or have filenames with multiple extensions. The dot character is just another character in the filename. A filename may have no extensions. In such a case, embodiments of the present disclosure may work with some portion of the filename.

Some operating systems do not use filename-based extension metadata in favor of a distinct file type code to identify the file format. Additionally, a creator code may be specified to determine which application would be launched when the file's icon was double-clicked. Further file systems, such as NTFS, support long file names and do not divide the filename into a name and an extension, but use suffixes to simulate extensions for compatibility with existing versions of Windows. It is contemplated that embodiments of the present disclosure can work with file type codes that identify file formats, or long filenames that use suffixes, as well.

Figure 5:
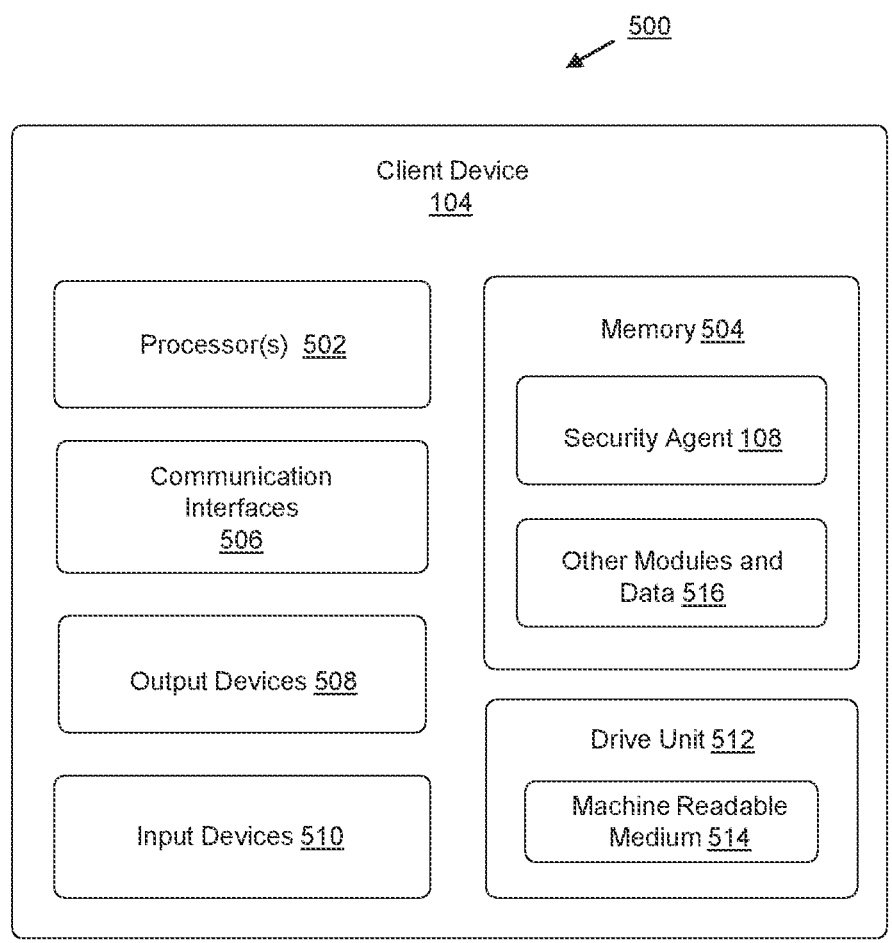
FIG. 5 illustrates an example system architecture for a client device.

FIG. 5 depicts an example system architecture 500 for a client device 104. A client device 104 can be one or more computing devices, such as a workstation, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 5, a client device 104 can include processor(s) 502, memory 504, communication interface(s) 506, output devices 508, input devices 510, and/or a drive unit 512 including a machine readable medium 514.

In various examples, the processor(s) 502 can be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing drivers and other computer-executable instructions for applications, routines, or processes stored in the memory 504, which can be associated with common types of volatile (RAM) and/or nonvolatile (ROM) memory.

In various examples, the memory 504 can include system memory, which may be volatile (such as RAM), non-volatile (such as ROM, flash memory, etc.) or some combination of the two. Memory 504 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the client device 104. Any such non-transitory computer-readable media may be part of the client device 104.

The memory 504 can store data, including computer-executable instructions, for a security agent 108 as described herein. The memory 504 can further store event data 118, and/or other data being processed and/or used by one or more components of the security agent 108, including event detectors 116, a compute engine 102, and a communication component 110. The memory 504 can also store any other modules and data 516 that can be utilized by the client device 104 to perform or enable performing any action taken by the client device 104. For example, the modules and data can be a platform, operating system, and/or applications, as well as data utilized by the platform, operating system, and/or applications.

The communication interfaces 506 can link the client device 104 to other elements through wired or wireless connections. For example, communication interfaces 506 can be wired networking interfaces, such as Ethernet interfaces or other wired data connections, or wireless data interfaces that include transceivers, modems, interfaces, antennas, and/or other components, such as a Wi-Fi interface. The communication interfaces 506 can include one or more modems, receivers, transmitters, antennas, interfaces, error correction units, symbol coders and decoders, processors, chips, application specific integrated circuits (ASICs), programmable circuit (e.g., field programmable gate arrays), software components, firmware components, and/or other components that enable the client device 104 to send and/or receive data, for example to exchange event data 118, and/or any other data with the security network 106.

The output devices 508 can include one or more types of output devices, such as speakers or a display, such as a liquid crystal display. Output devices 508 can also include ports for one or more peripheral devices, such as headphones, peripheral speakers, and/or a peripheral display. In some examples, a display can be a touch-sensitive display screen, which can also act as an input device 510.

The input devices 510 can include one or more types of input devices, such as a microphone, a keyboard or keypad, and/or a touch-sensitive display, such as the touch-sensitive display screen described above.

The drive unit 512 and machine readable medium 514 can store one or more sets of computer-executable instructions, such as software or firmware, that embodies any one or more of the methodologies or functions described herein. The computer-executable instructions can also reside, completely or at least partially, within the processor(s) 502, memory 504, and/or communication interface(s) 506 during execution thereof by the client device 104. The processor(s) 502 and the memory 504 can also constitute machine readable media 514.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to predict a digital file has been renamed by a malicious computer program, comprising:
   creating a feature vector comprising a plurality of values, wherein each value represents a corresponding portion of a filename extension for the digital file;
   during an inference workflow of a neural network model:
      creating an embedding vector representing the feature vector for the filename extension for the digital file; and
      creating a class label prediction value based on an evaluation of the embedding vector representing the feature vector for the filename extension for the digital file, a first plurality of embedding vectors representing a plurality of feature vectors for a plurality of benign filename extensions, and a second plurality of embedding vectors representing a plurality of feature vectors for a plurality of malicious filename extensions;
   generating a prediction of whether the digital file has been renamed by the malicious computer program based on the class label prediction value;
   transmitting, via a communications network, the prediction to one or more of a plurality of client computing devices when the prediction indicates the digital file has been renamed by the malicious computer program; and
   generating behavior detection logic for execution by the one or more of the plurality of client computing devices, responsive to receiving the prediction that indicates the digital file has been renamed by the malicious computer program.

2. The method of claim 1, further comprising providing a decision value indicating one of: the digital file has been renamed by a malicious computer program, and the digital file has not been renamed by a malicious computer program, responsive to the prediction.

3. The method of claim 1, further comprising:
   creating, for each of the plurality of benign filename extensions, a respective feature vector comprising a plurality of values, wherein each value represents a corresponding portion of the benign filename extension;
   receiving the plurality of malicious filename extensions;
   creating, for each of the plurality of malicious filename extensions, a respective feature vector comprising a plurality of values, wherein each value represents a corresponding portion of the malicious filename extension; and
   creating, during a training workflow of the neural network model, the first plurality of embedding vectors representing the plurality of feature vectors for the plurality of benign filename extensions, and the second plurality of embedding vectors representing the plurality of feature vectors for the plurality of malicious filename extensions.

4. The method of claim 3,
   wherein each of the plurality of benign filename extensions indicates a benign format, a characteristic, contents, or an intended use of the contents, of a corresponding digital file; and
   wherein each of the plurality of malicious filename extensions indicates a malicious format, a characteristic, contents, or an intended use of the contents, of a corresponding digital file.

5. The method of claim 3, further comprising creating additional malicious filename extensions and adding the additional malicious filename extensions to the plurality of malicious filename extensions.

6. The method of claim 5, wherein creating the additional malicious filename extensions comprises performing one or more of a plurality of permutations on one or more of the plurality of malicious filename extensions.

7. The method of claim 3, further comprising creating additional benign filename extensions by performing one or more of a plurality of permutations on one or more of the plurality of benign filename extensions and adding the additional benign filename extensions to the plurality of benign filename extensions.

8. The method of claim 3, wherein creating, for each of the plurality of malicious filename extensions, the respective feature vector comprising the plurality of values, wherein each value represents a corresponding portion of the malicious filename extension, comprises creating, for each of the plurality of malicious filename extensions, the respective feature vector comprising the plurality of values, wherein each value represents one or more characters of the malicious filename extension.

9. A computer system, comprising:
   one or more processors;
   a memory to store computer-executable instructions that, when executed by the one or more processors, cause the one or more processors to perform operations comprising:
   creating a feature vector comprising a plurality of values, wherein each value represents a corresponding portion of a filename extension for a digital file;
   during an inference workflow of a neural network model:
      creating an embedding vector representing the feature vector for the filename extension for the digital file; and
      creating a class label prediction value based on an evaluation of the embedding vector representing the feature vector for the filename extension for the digital file, a first plurality of embedding vectors representing a plurality of feature vectors for a plurality of benign filename extensions, and a second plurality of embedding vectors representing a plurality of feature vectors for a plurality of malicious filename extensions;
   generating a prediction of whether the digital file has been renamed by a malicious computer program based on the class label prediction value;
   transmitting, via a communications network, the prediction to one or more of a plurality of client computing devices when the prediction indicates the digital file has been renamed by the malicious computer program; and
   generating behavior detection logic for execution by the one or more of the plurality of client computing devices, responsive to receiving the prediction that indicates the digital file has been renamed by the malicious computer program.

10. The computer system of claim 9, further comprising:
   creating, for each of the plurality of benign filename extensions, a respective feature vector comprising a plurality of values, wherein each value represents a corresponding portion of the benign filename extension;
   receiving the plurality of malicious filename extensions;
   creating, for each of the plurality of malicious filename extensions, a respective feature vector comprising a plurality of values, wherein each value represents a corresponding portion of the malicious filename extension; and creating, during a training workflow of the neural network model, the first plurality of embedding vectors representing the plurality of feature vectors for the plurality of benign filename extensions, and the second plurality of embedding vectors representing the plurality of feature vectors for the plurality of malicious filename extensions.

11. The system of claim 10, further comprising creating additional malicious filename extensions by performing one or more of a plurality of permutations on one or more of the plurality of malicious filename extensions and adding the additional malicious filename extensions to the plurality of malicious filename extensions.

12. The system of claim 10, further comprising creating additional benign filename extensions by performing one or more of a plurality of permutations on one or more of the plurality of benign filename extensions and adding the additional benign filename extensions to the plurality of benign filename extensions.

13. The system of claim 10, wherein creating, for each of the plurality of malicious filename extensions, the respective feature vector comprising the plurality of values, wherein each value represents a corresponding portion of the malicious filename extension, comprises creating, for each of the plurality of malicious filename extensions, the respective feature vector comprising the plurality of values, wherein each value represents one or more characters of the malicious filename extension.

14. One or more non-transitory computer-readable media storing computer-executable instructions that, when executed by one or more processors, cause the one or more processors to perform operations comprising:

creating a feature vector comprising a plurality of values, wherein each value represents a corresponding portion of a filename extension for a digital file;

during an inference workflow of a neural network model:
creating an embedding vector representing the feature vector for the filename extension for the digital file; and creating a class label prediction value based on an evaluation of the embedding vector representing the feature vector for the filename extension for the digital file, a first plurality of embedding vectors representing a plurality of feature vectors for a plurality of benign filename extensions, and a second plurality of embedding vectors representing a plurality of feature vectors for a plurality of malicious filename extensions;

generating a prediction of whether the digital file has been renamed by a malicious computer program based on the class label prediction value;

transmitting, via a communications network, the prediction to one or more of a plurality of client computing devices when the prediction indicates the digital file has been renamed by the malicious computer program; and generating behavior detection logic for execution by the one or more of the plurality of client computing devices, responsive to receiving the prediction that indicates the digital file has been renamed by the malicious computer program.

15. The one or more non-transitory computer-readable media of claim 14, further comprising:

creating, for each of the plurality of benign filename extensions, a respective feature vector comprising a plurality of values, wherein each value represents a corresponding portion of the benign filename extension;

receiving the plurality of malicious filename extensions;

creating, for each of the plurality of malicious filename extensions, a respective feature vector comprising a plurality of values, wherein each value represents a corresponding portion of the malicious filename extension; and creating, during a training workflow of the neural network model, the first plurality of embedding vectors representing the plurality of feature vectors for the plurality of benign filename extensions, and the second plurality of embedding vectors representing the plurality of feature vectors for the plurality of malicious filename extensions.

16. The one or more non-transitory computer-readable media of claim 15, further comprising creating additional malicious filename extensions by performing one or more of a plurality of permutations on one or more of the plurality of malicious filename extensions and adding the additional malicious filename extensions to the plurality of malicious filename extensions.

17. The one or more non-transitory computer-readable media of claim 15, further comprising creating additional benign filename extensions by performing one or more of a plurality of permutations on one or more of the plurality of benign filename extensions and adding the additional benign filename extensions to the plurality of benign filename extensions.

18. The one or more non-transitory computer-readable media of claim 15, wherein creating, for each of the plurality of malicious filename extensions, the respective feature vector comprising the plurality of values, wherein each value represents a corresponding portion of the malicious filename extension, comprises creating, for each of the plurality of malicious filename extensions, the respective feature vector comprising the plurality of values, wherein each value represents one or more characters of the malicious filename extension.

* * * * *